United States Patent
Monjardin et al.

(10) Patent No.: US 11,385,614 B2
(45) Date of Patent: Jul. 12, 2022

(54) GUIDED DRIVER DEVICE

(71) Applicant: International Business Machines Corporation, Armonk, NY (US)

(72) Inventors: Michael Benosa Monjardin, Shenzhen (CN); Tao Song, Shenzhen (CN); XiYuan Yin, Guangzhou (CN); Jia Yu Zheng, Foshan (CN); Yunfei Wang, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/095,076

(22) Filed: Nov. 11, 2020

(65) Prior Publication Data

US 2022/0147013 A1    May 12, 2022

(51) Int. Cl.
*G05B 19/402* (2006.01)

(52) U.S. Cl.
CPC .. *G05B 19/402* (2013.01); *G05B 2219/35443* (2013.01)

(58) Field of Classification Search
CPC .................... G05B 19/402; G05B 2219/35443
See application file for complete search history.

(56) References Cited

U.S. PATENT DOCUMENTS

| | | | |
|---|---|---|---|
| 3,393,721 A | 7/1968 | De Forest | |
| 3,583,451 A | 6/1971 | Dixon | |
| 4,017,756 A | 4/1977 | Davidson | |
| 4,329,095 A * | 5/1982 | Schmuck | B25H 1/0092 408/112 |
| 4,922,436 A | 5/1990 | Dohm et al. | |
| 4,924,732 A | 5/1990 | Hoskins et al. | |
| 5,484,026 A | 1/1996 | Susaki et al. | |
| 7,178,432 B1 | 2/2007 | Han et al. | |
| 8,245,601 B1 | 8/2012 | Hastama et al. | |
| 9,737,979 B1 | 8/2017 | Sungkhaphong et al. | |
| 2009/0090526 A1 * | 4/2009 | Zannini | E02D 17/20 173/37 |

(Continued)

FOREIGN PATENT DOCUMENTS

| | | |
|---|---|---|
| CN | 201950612 U | 8/2011 |
| CN | 202668435 U | 1/2013 |

(Continued)

OTHER PUBLICATIONS

IBM, "Automatic Screwdriver With Vacuum Pick-Up," ip.com, An IP.com Prior Art Database Technical Disclosure, IP.com No. IPCOM000063065D, IP.com Electronic Publication Date: Feb. 18, 2005, 3 pages https://priorart.ip.com/IPCOM/000063065.

(Continued)

*Primary Examiner* — Ronald D Hartman, Jr.
(74) *Attorney, Agent, or Firm* — Peter J. Edwards

(57) ABSTRACT

A driver device comprises a housing and a driving-bit socket in the housing. The driver device may comprise a first guide-leg track on the housing. A first guide leg may be inserted into the first guide leg track. The driver device may also comprise a first guide-leg foot at an end of the first guide leg. The first guide-leg foot may be configured to interface with a surface of the driving recipient. The first guide leg may retract into the first guide-leg track as the driver device drives a driving object into the driving recipient.

8 Claims, 6 Drawing Sheets

(56) References Cited

U.S. PATENT DOCUMENTS

| | | | | |
|---|---|---|---|---|
| 2009/0206122 | A1* | 8/2009 | King | B25B 23/08 |
| | | | | 173/217 |
| 2014/0265526 | A1* | 9/2014 | Knapp | E01C 23/094 |
| | | | | 299/39.3 |
| 2015/0190182 | A1 | 7/2015 | Sharifi-Mehr et al. | |
| 2017/0260771 | A1* | 9/2017 | Knudsen | E04H 12/347 |
| 2018/0333811 | A1* | 11/2018 | Maeda | B23P 19/001 |

FOREIGN PATENT DOCUMENTS

| | | |
|---|---|---|
| CN | 203045288 U | 7/2013 |
| CN | 103934673 B | 8/2016 |
| DE | 10159336 B4 | 8/2004 |
| JP | 2016507295 A | 3/2016 |

OTHER PUBLICATIONS

Monjardin et al., "Adjustible Suction Screwdriver," U.S. Appl. No. 17/095,092, filed Nov. 11, 2020.

List of IBM Patents or Patent Applications Treated as Related, Dated Nov. 10, 2020, 2 pages.

\* cited by examiner

GUIDED DRIVER DEVICE

BACKGROUND

The present disclosure relates to driver devices, and more specifically, to devices that drive drill bits, screws, and bolts into objects.

Driver devices, such as drills and screwdrivers, operate by driving a driving object (such as a drill bit or fastener) into a material that is to be drilled into or fastened objects (sometimes referred to as a "driving recipient"). The orientation of the driving object in the driving recipient is partially determined by the angle of the driver device. A typical driver device that is oriented perpendicular to the surface of the driving recipient can be used to drive a driving object into the driver device at an angle that is also perpendicular to the surface. Varying the angle of the driver device with respect to the surface of the driving recipient can cause the angle of the driving object to vary as well. This can be utilized to drill holes in driving recipients that are at particular angles, such as 45 degrees offset from the surface of the driving recipient.

SUMMARY

Some embodiments of the present disclosure can be illustrated as a driver device comprising a housing and a driving-bit socket in the housing. The driver device may comprise a first guide-leg track on the housing. A first guide leg may be inserted into the first guide leg track. A first deployment level may describe the extent to which the first guide leg is retracted into the first guide-leg track. The driver device may also comprise a first guide-leg foot at an end of the first guide leg. The first guide-leg foot may be configured to interface with a surface of the driving recipient. The first guide leg may retract into the first guide-leg track as the driver device drives a driving object into the driving recipient.

Some embodiments of the present disclosure may also take the form of a method of operating a driver device. The method may comprise starting the driver device and monitoring a first measurement of a first pressure sensor that is attached to a first guide leg on the driver device. The method may also comprise monitoring a second measurement of a second pressure sensor that is attached to a second guide leg on the driver device. The method may also comprise detecting that a pressure-deviation value between the first and second measurements is above a pressure-deviation-value threshold. Finally, the method may comprise triggering a first fault response based on the detecting.

Some embodiments of the present disclosure may also take the form of a system comprising a processor and a memory in communication with the processor. The memory may contain program instructions that, when executed by the processor, are configured to cause the processor to perform the above method of operating a driver device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
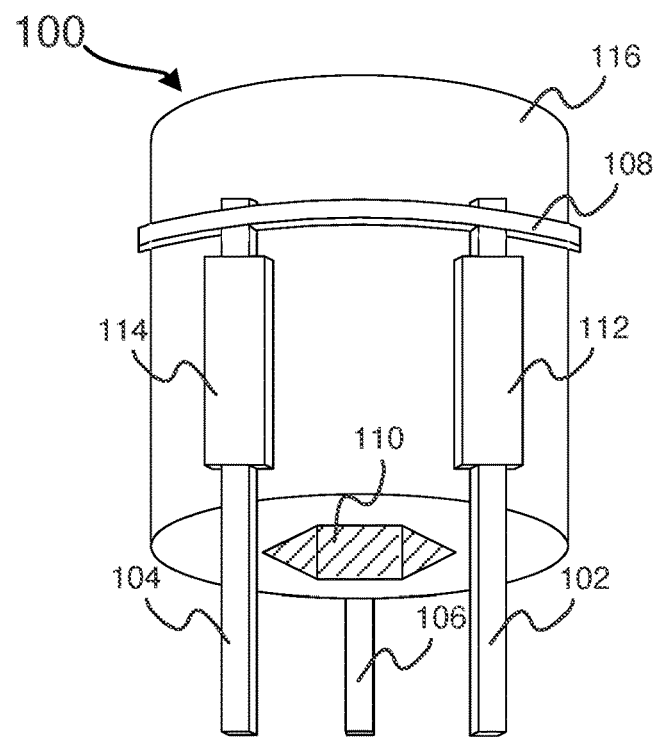
FIG. 1 depicts an example embodiment of a driver device with three guide legs to maintain an orientation of the driver device during operation.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to driver devices, and more specifically, to devices that drive drill bits, screws, and bolts into objects. While the present disclosure is not necessarily limited to such applications, various aspects of the disclosure may be appreciated through a discussion of various examples using this context.

Driver devices, such as drills, impact drivers, and impact wrenches, can be used to drive driving objects, such as screws, bolts, and drill bits, into driving recipients. For example, a drill may be used to drive a drill bit into a wooden board, printed circuit board, metal block, granite slab, or concrete floor. This may be useful to insert holes into the driving recipient that can later be used to facilitate inserting other structural features into the holes, such as screws, bolts, pegs, pins, nail, or others. Similarly, in some use cases a driver device may drive a screw, bolt, nail, or other objects into a driving recipient without first drilling a hole.

In either case, it may be preferable for the driving object to be driven at a certain angle. For example, some products, such as high-end electronic personal devices, are manufactured with an aesthetic that requires exterior screws to be very flush with the surrounding exterior housing. A screw being inserted at an unintended angle may cause the screw to rest at that unintended angle once driven into the housing, resulting in part of the screw head jutting out past the surface of the exterior housing.

For similar reasons, holes that are drilled before other driving objects (such as screws or bolts) are inserted may also be required to be inserted at a certain angle. For example, some use cases involve pre-drilling holes (sometimes called pilot holes) in multiple components that are then attached together with a screw or bolt. If one or both of these pilot holes are drilled at an incorrect angle, the angle of the holes through which a screw or bolt is to be inserted may be at significantly unequal angles. A screw inserted through both holes in such a situation may cause a prying force on one or both of the parts, potentially causing the parts to shift. In some instances, this may lead to the parts appearing to not fit together, which may have a negative effect on the perceived value of the parts. In some more serious instances, such as sensitive electronics, the prying force may cause the parts to shift to positions in which the parts no longer function together (for example, breaking a connection between two parts), or may no longer function individually (for example, damaging a printed circuit board).

In some industries, driver devices with very high torque are used to drive screws or bolts into threaded holes, or attach nuts to pre-existing threaded bolts. For example, some auto-racing wheels are attached using very powerful driver "guns" that are able to attach large bolts or nuts to a car in a matter of a few seconds. Similarly, automated assembly lines of large machinery devices may use robotic driver devices that are capable of attaching parts together with a large screw very quickly. If these screws, bolts, or nuts are driven at an angle that does not match the threads on the corresponding parts, the powerful driver may overpower the resistance of the threads, causing the threads to be stripped or damaged. This may result in the screw, bolt, or nut being stuck in place. Worse, overpowering the pre-existing threads may cause the threads to lock together, causing the powerful rotational force of the driver to be translated into the driving recipient. In some instances, the driving recipient may not be designed to accept those forces, and may be damaged as a result.

Similar problems can exist for products that have complex construction. For example, some products are constructed by inserting screws in "pocket holes." These pocket holes can be used to hide screws that hold components together, and also can be used to join components that fit together at odd angles or in tight spaces. These pocket holes are typically drilled in advance at precise angles that allow the inserted driving object (e.g., screw) to hold the components together. If the holes are drilled at an improper angle, it may be difficult or impossible to drive the driving object into the hole, and the driving object may not effectively perform its function once it is driven.

For all of the above reasons, driving a driving object sufficiently close to the angle at which the driving object is intended to be inserted into a driving recipient (sometimes referred to herein as the "desired angle") can be very important. Further, the desired angle is sometimes very specific and offers little room for error, exacerbating the difficulty.

Unfortunately, it can sometimes be quite difficult to ensure that a driver device is positioned sufficiently close to the desired angle before driving starts. Further, it can be equally difficult, and oftentimes more difficult, to ensure that a driver device stays sufficiently close to the desired angle during the driving process. Some typical methods of addressing these issues include manually inspecting a driver device (sometimes colloquially referred to as "eyeballing it"), analyzing images of a driver device with optical cameras, and monitoring levels (e.g., spirit levels) on driver devices. These methods are often very error prone, and deviations from a desired angle may not be detected until the error is beyond correction. Some other typical methods include monitoring driver-device orientation with laser measurements, such as using laser levels on a driver device or lasers pointed at a driver device. However, these solutions can be expensive, often have poor mobility, and may not be suitable for situations in which a driver device is driving into an uneven or reflective surface.

Some embodiments of the present disclosure address the described issues by attaching one or more guide legs to a driver device. These guide legs may be used to monitor the angle of a driver device, or to maintain the angle of a driver device sufficiently close to a desired angle. In some embodiments, a driver device to which these guide legs are attached may take the form of a powered tool that performs the driving operation (e.g., a drill, an impact driver, or an impact wrench). In other embodiments, a driver device to which these guide legs are attached may take the form of an attachment that may be inserted onto such a power tool.

In some embodiments, one or more guide legs may be attached to the driver device with one or more guide-leg tracks that keep the guide legs attached and enable a sliding motion of the guide legs. For example, in some embodiments, a set of guide legs may be attached to the outer housing of a driver device with a set of guide-leg tracks that are securely mounted to the housing. The guide-leg tracks may cause the guide legs to be oriented in at an angle that is approximately parallel to the angle of a drill bit inserted into the driver device. Prior to driver-device operation, the guide legs may extend past the drill bit, causing them to make contact with the surface of a driving recipient. As the driver device is operated, the drill bit may be pushed toward and into the driving recipient. As this occurs, the guide legs may slide inside the corresponding guide-leg tracks, causing them to remain in contact with the surface of the driving recipient while the remainder of the driver device is pushed toward the driving recipient.

As discussed in the above example, embodiments of the present disclosure allow the guide legs to slide in the guide-leg tracks as the driver device is pushed towards the driving recipient. In other words, the guide legs effectively retract toward the "rear" of the driver device (i.e., the portion of the driver device located away from the driving recipient). The extent to which the guide legs are extended or retracted in these guide-leg tracks may be referred to herein as the "deployment level" of the guide legs. For example, a guide leg that is fully extended out in front of a driving object may be referred to as either being "fully extended" or as having a deployment level of 100%.

In some embodiments, keeping all guide legs in constant contact with the surface of the driving recipient may maintain the angle of the driver device sufficiently close to a desired angle. This constant contact may be maintained during operation of the driver device if the deployment level of each guide leg is kept in equal proportion to the deployment levels of the other guide legs. In other words, by ensuring, for example, that, if the deployment level of one guide leg decreases by 10% (e.g., from 50% to 40%, or by 3 cm), that the deployment level of the other guide legs also decreases by 10%.

In an effort to maintain a constant relative deployment level of a driver device's guide legs, some embodiments of the present disclosure may include an ability to monitor the deployment level of each guide leg during operation of the driver device. For example, in some embodiments a driver device may feature guide-leg tracks that are capable of detecting whether the corresponding guide leg is retracting or extending and of calculating the deployment level of the guide leg using that information. In these embodiments, the guide-leg tracks may be able report this information to other guide-leg tracks or to a central processor located on the driver device. If one of the guide-leg tracks or a central processor determines that the deployment level of a guide leg is becoming out of sync with the deployment level of other guide legs, the driver device may trigger a fault response. This fault response may include, for example, alerting a user of the driver device (e.g., outputting a sound from a speaker on the driver device, displaying a notification on an LCD display of the driver device), or interrupting a motor in the driver device, preventing the driver device from continuing to drive a driving object until the deployment levels are brought back in sync.

While alerts to a user that a guide leg's deployment level is not in sync with the deployment level of other guide legs may be useful in some instances, in some instances other safeguard features may be beneficial. For example, in some instances, a user may be operating a driver device in a loud working environment, preventing the user from hearing an audible fault-response notification. In some instances a driver device may be utilized in a situation in which the angle in which a driver object is driven into a driving recipient (sometimes referred to herein as the "driving angle") is very error intolerant. In other words, even very small deviations from a desired angle may result in an unacceptable product. In these instances, a user may be constantly bombarded with fault notifications, but may not be capable of reacting quickly enough to avoid a driving angle that deviates unacceptably from the desired angle.

Some embodiments of the present disclosure may, for these and other reasons, utilize a guide-leg lock, sometimes referred to herein as a "proportional lock" that maintains the proportional deployment of the guide legs. For example, a proportional lock may take the form of a rigid component (e.g., a ring) connected to each guide leg that prevents the guide legs from moving independently. In this example, if a guide leg extends or retracts within a guide-leg track, it would also cause the proportional lock to extend or retract by the same amount. Because the proportional lock would also be connected to each other guide leg, the proportional lock would also cause the other guide legs to extend or retract by the same amount.

In some such embodiments, the guide legs may be attached to the proportional lock at a fixed position, causing the deployment level of the guide legs to be secure but non-adjustable. This may be beneficial, for example, in use cases in which a driver device is expected to always have the same desired angle in operation (e.g., perpendicular to the surface of the driving recipient). In other embodiments, the guide legs may be capable of sliding within the proportional lock before being locked in place. Once being locked in place, the deployment level of a guide leg with respect to another leg may be constant, encouraging the driver device to operate at the desired angle set when the proportional lock was placed in a "locked" state. This may enable the driver device to adapt to multiple desired angles by adjusting the relative deployment levels of the guide legs before operation of the driver device. This may be beneficial in use cases in which a driver device is expected to perform in various applications, such as a general-purpose drill or impact driver.

In some use cases, maintaining a proportional deployment level between the guide legs of a driver device may be insufficient to ensure that a driver device is driving at a desired angle. For example, a driver device may be operating in a situation with a desired angle of 90 degrees, and thus the guide legs of the driver device may all have equal deployment levels while driving a drill bit into the driving recipient. However, if a user is operating the driver device, the user may not be holding the driver device in a way that all guide legs are firmly positioned on the surface of the driving recipient. This would likely cause the driving angle to deviate from the desired angle, but the deployment levels of the guide legs would not provide an indication of this deviation.

Thus, some embodiments of the present disclosure feature pressure sensors at the end of guide legs. These pressure sensors may contact the surface of the driving recipient in operation, and may measure the pressure between the guide leg and the surface. In some such embodiments, a fault condition may be detected if any of the sensors does not detect any pressure (for example, if the guide leg is not in contact with the surface). In some embodiments, a fault condition may be detected even if a guide leg is contacting a surface of a driving recipient, but the pressure measured at one guide leg does not equal the pressures measured at other guide legs. These sensors may beneficially increase the likelihood that a driver device is being pressed into a recipient at the intended angle, and thus the likelihood that the drilling angle of the driver device is sufficiently close to the desired angle.

FIG. 1 illustrates a driver device 100 that features three guide legs 102, 104, and 106 and a proportional lock 108. Driver device 100 may be a component of a larger device, such as the end of an impact driver or drill device. Driver device may also be an add-on component of such a device, and may, for example, be inserted into a socket on a drill that would normally be configured to receive a drill bit.

Driver device 100 features a bit socket, which may receive a bit that could be used to drive into a driving recipient. For example, socket 110 may receive a drill bit that could be used to bore a hole in a driving recipient or a screwdriver bit that could be paired with a screw and used to drive the screw into a driving recipient.

Driver device 100 is also illustrated as disclosing also features guide-leg tracks 112 and 114. Guide legs 102 and 104 may be capable of sliding in guide-leg tracks 112 and 114 respectively, and thus may be capable of extending past and away from bit socket 110 (and an enclosed bit) or retracting towards (and potentially further than) bit socket 110. In other words, guide legs 102 and 104 may be capable of moving, as illustrated in FIG. 1, up and down in guide-leg tracks 112 and 114. As described herein, the extent to which a guide leg is extended (i.e., moved "down" in FIG. 1) or retracted (i.e., moved "up" in FIG. 1) may be referred to as that guide leg's deployment level.

As illustrated, guide-leg tracks 112 and 114 are depicted with housings that are attached to a main housing 116 of driver device 100. In some embodiments, these housing may also contain components that enable guide-leg tracks 112 and 114, or driver device 100, to monitor the deployment level of guide legs 102 and 104. For example, guide-leg tracks 112 and 114 may contain circuitry that detect when the corresponding guide leg extends or retracts, which could be used to calculate the deployment level of the corresponding guide leg. This calculation could either be performed, for example, by one or more processor within one or more of guide-leg tracks 112 and 114 or elsewhere within driver device 100. In other embodiments, guide-leg tracks 112 and 114 may take different, and potentially simpler, forms, such as a recess within housing 116 into which protrusions of guide leg 112 and 114 are seated and are capable of sliding. Finally, while a third guide-leg track to interact with guide leg 106 is not illustrated in FIG. 1, in some embodiments of driver device 100 guide leg 106 may pass through a guide-leg track that is similar or identical to guide-leg tracks 112 and 114.

As illustrated, proportional lock 108 connects with guide legs 102 and 104 above guide-leg tracks 112 and 114. While not illustrated in FIG. 1, proportional lock 108 may also connect with guide leg 106 on the other side of device driver 100. In some embodiments, the connection between proportional lock 108 and the guide legs may be a fixed connection, such that guide legs 102 and 104 may be incapable of moving with respect to proportional lock 108 (e.g., sliding through proportional lock 108). In these embodiments, the deployment levels of guide legs 102 and 104 may be in a constant proportion. For example, if guide leg 102 were retracted (i.e., guide leg 102 moved "up," decreasing its deployment level), guide leg 102 would push up against proportional lock 108 if the connection between proportional lock 108 and guide leg 102 were fixed. If the connection between proportional lock 108 and guide leg 104 were also fixed, this would cause proportional lock to also pull guide leg 104 "up," thereby retracting guide leg 104 (i.e., decreasing its deployment level). This would also be true of guide leg 106 in embodiments in which proportional lock is connected 108 to guide leg 106 with a fixed connection. In other words, with a fixed connection, a change in the deployment level of either guide leg 102 or 104 would cause an equal change in the deployment level of the other guide leg.

In some embodiments, the connection between proportional lock 108 and guide legs 102 and 104 may be configurable between a locked and unlocked state. In these embodiments, the proportional lock 108 may be described as being in a locked state with respect to a guide leg (also referred to herein as proportional lock 108 locking the guide leg) when the proportional lock 108 prevents the guide leg from extending or retracting without also extending or retracting other guide legs with that the proportional lock is locking.

For example, in some embodiments guide leg 102 may be capable of sliding through proportional lock 108 when proportion lock 108 is in an unlocked state with respect to guide leg 102 (also referred to herein as proportional lock 108 not locking guide leg 102). In this state, guide leg 102 could be retracted (i.e., the deployment level of guide leg 102 could be reduced) without affecting the deployment level of guide leg 104. Thus, guide leg 102 would have a smaller deployment level than guide leg 104. However, if proportional lock 108 then locks guide leg 102 and proportional lock 108 has also locked guide leg 104, any further retraction or extension of guide leg 102 would cause guide leg 104 to retract or extend by the same amount.

Proportional lock 108 may transition from a locked state to an unlocked state by various mechanisms. For example, proportional lock 108 could include a set of gears that interface with a set of corresponding teeth on guide legs 102 and 104. Pushing a button or moving a lever on the exterior of proportional lock 108 may prevent those gears from rotating, which may in turn prevent one or more of guide legs 102 and 104 from moving with respect to proportional lock 108. Pushing the button (or moving the lever) a second time may unlock those gears, allowing the teeth of guide legs 102 and 104 to rotate the gears rather than move proportional lock 108.

The portions of guide legs 102, 104, and 106 that are configured to contact the surface of a driving recipient may, in some embodiment, feature components to increase the likelihood that the actual driving angle at which driver 100 is operating is sufficiently close to a desired angle. These portions, sometimes referred to herein as the "foot" of a guide leg, are illustrated in FIG. 1 as the lower portions of guide legs 102, 104, and 106. For example, in some embodiments the feet of guide legs 102, 104, and 106 may contain a rubberized compound that causes guide legs 102, 104, and 106 to be less likely to slip on the surface of a driving recipient. In some embodiments, guide legs 102, 104, and 106 may all connect to a ring that rests on the surface of a driving recipient and distributes the force from the guide legs through the ring (sometimes referred to herein as a "seating ring").

In some embodiments, driver device 100 may also feature one or more pressure sensors on the feet of guide legs 102, 104, and 106. These pressure sensors may, for example, detect whether a minimal pressure is being applied, such that the pressure sensors could be used to determine whether guide legs 102, 104, and 106 are all making contact with a surface. These pressure sensors may also (or alternatively), for example, provide a numerical measurement of the pressure between the guide legs 102, 104, and 106 and the surface of a driving recipient. In these embodiments, these measurements may then be used to calculate the pressure deviation between each guide leg. This pressure deviation could be expressed by a pressure deviation value. For example, the pressure readings from pressure sensors on each of guide legs 102, 104, and 106 could be compared, and the difference between the largest pressure reading and the smallest pressure reading could be determined. That difference may be referred to as the "pressure deviation value" for device driver 100 (or guide legs 102, 104, and 106), and may be an expression of the extent to which device driver 100 is pressing each guide leg 102, 104, and 106 into a driving recipient. If the pressure deviation value is unacceptably high (e.g., above a pressure-deviation-value threshold), it may indicate a risk that the device driver is driving at a driving angle that is unacceptably far from the desired angle.

While driver device 100 is illustrated with three guide legs 102, 104, and 106, some embodiments of the present disclosure could feature fewer or more than three guide legs. Using three guide legs on a driver device may be advantageous in some embodiments because three guide legs, when properly seated on a surface of a driving recipient, may help to prevent a driver device from tilting within any plane (e.g., tilting up or down, tilting left or right). However, in some embodiments other methods of achieving a similar result may be possible.

Figure 2:
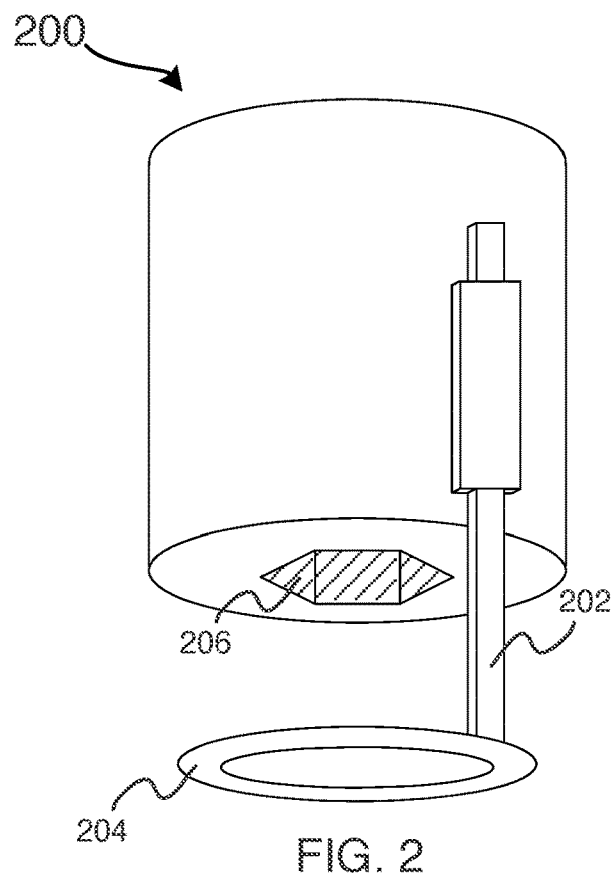
FIG. 2 depicts an example embodiment of a driver device with one guide leg and a seating ring to maintain an orientation of the driver device during operation.

FIG. 2 illustrates a driver device 200 that features a single guide leg 202 attached to a seating ring 204. Seating ring 204, which may be described as a "foot" of guide leg 202, may beneficially distribute the force applied by guide leg 202 over a greater area onto the surface of a driving recipient. By distributing the force of guide leg 202, seating ring 204 may prevent driver device 200 from tilting away from a desired angle more effectively than guide leg 202 would be capable of doing individually.

Further, because seating ring 204 takes the form of a ring, a bit inserted into bit socket 206 may be capable of passing through seating ring 204. Thus, as driver device 200 is pushed toward a driving recipient, seating ring 204 would not inhibit the bit from driving into the driving recipient as long as the bit is smaller in diameter than the inner diameter of seating ring 204.

Driver device 200 is illustrated as containing a single guide leg 202 for the purposes of explaining the potential benefits of a seating ring. Other embodiments of driver device 200 may have a larger number of guide legs, which may also be attached to seating ring 204. This may not only increase the stability of driver device 200, but may also cause seating ring 204 to act as a fixed proportional lock for the guide legs.

Figure 3A:
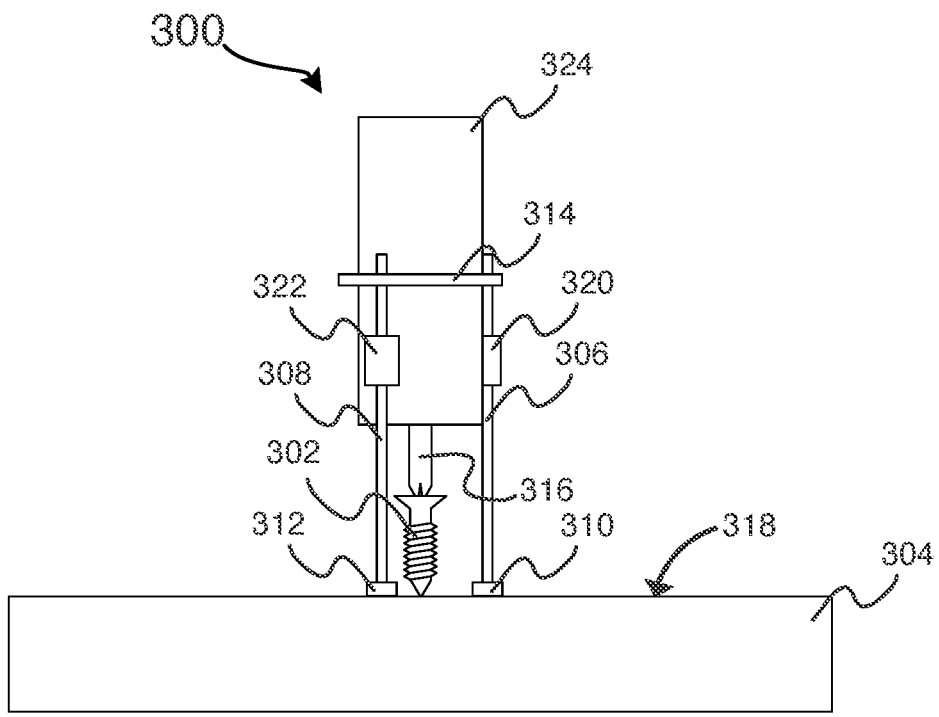
FIG. 3A depicts a first view of an example embodiment of a driver device with a set of guide legs before driving a screw into a driving recipient.
Figure 3B:
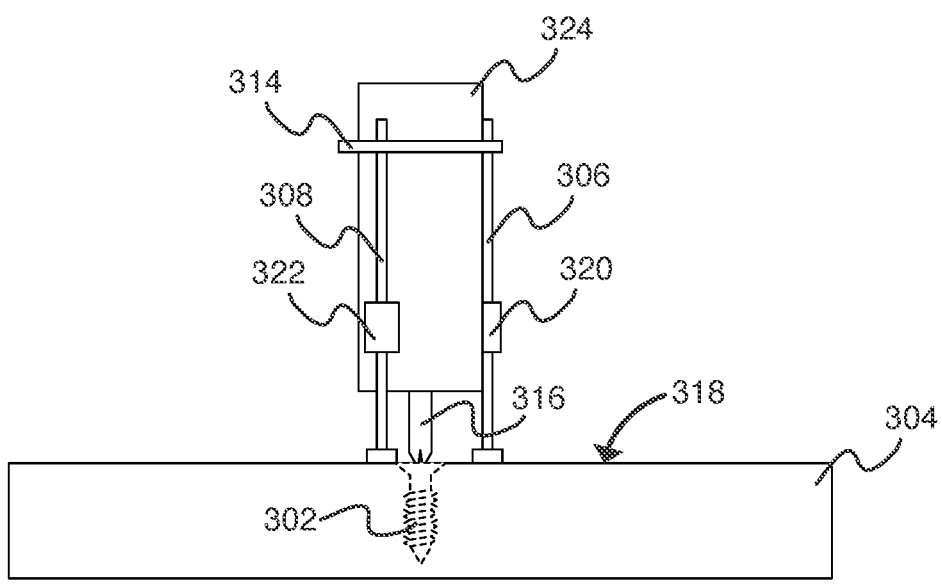
FIG. 3B depicts a second view of an example embodiment of a driver device with a set of guide legs after driving a screw into a driving recipient.

To aid in understanding, FIGS. 3A and 3B depict an example driver device 300 in two stages of operation. FIG. 3A depicts a first view of driver device 300 before driving a screw 302 (a "driving object") into a driving recipient 304 (e.g., a wooden board). Driver device 300 is depicted as featuring a set of guide legs 306 and 308, but also feature one or more additional guide legs that are not visible in FIG. 3A (e.g., behind guide leg 308). Each of guide legs 306 and 308 are illustrated as including feet 310 and 312, which may take the form of a pressure sensor, a rubber tab, a set of spikes to stab into a surface of a driving recipient, or others. Driver device 300 also features proportional lock 314, which may be fixed in a "locked" state, or may be configurable between a locked state and an unlocked state. In a locked state, proportional lock 314 may prevent the deployment level of either guide leg 306 or 308 from changing without causing an equal change in the other guide leg. Finally, driver device 300 also features screwdriver bit 316 (a "driving bit"), which may be used to drive screw 302 (the "driving object") into driving recipient 304.

As FIG. 3A illustrates driver device 300 before driving screw 302, guide legs 306 and 308 are in an extended state. In some embodiments, guide legs 306 and 308 may have been adjusted to cause driver device 300 to sit at a desired angle (here, 90 degrees from the surface 318 of driving recipient 304). Guide legs 306 and 308 may then have been shortened by pressing driver device 300 towards surface 318 until both guide legs 306 and 308 and screw 302 were touching surface 318. Driver device 300 features guide-leg tracks 320 and 322, in which guide legs 306 and 308 may be capable of sliding during these adjustments. Guide-leg tracks 320 and 322 may be fixedly attached to the main housing 324 of driver device 300.

FIG. 3B depicts a second view of driver device 300 after it has driven screw 302 into driving recipient 304. The main housing 324 of driver device 300, along with guide-leg tracks 320 and 322, are shown as having shifted towards surface 318 (i.e., towards driving recipient 304, or "downwards") with respect to guide legs 306 and 308 and proportional lock 314. In other words, as driver device 300 was pushed toward driving recipient 304 as part of driving screw 302 into driving recipient 304, guide legs 306 and 308 retracted within guide-leg tracks 320 and 322. This may have enabled guide legs 306 and 308 to maintain constant contact with surface 318 during the driving process, while also allowing main housing 324, and with it, driver bit 316, to be pushed toward surface 318 at the desired angle.

In FIGS. 3A and 3B, the constant proportion of the guide legs' deployment levels may be beneficial to increase the likelihood that driver device 300 drives screw 302 into driving recipient 304 at a desired angle. However, as previously discussed, it may be possible for a driver device 300 to be tilted away from a desired angle even when the deployment levels of all guide legs on a driver device remain in proportion. In these situations, pressure sensors on the feet of guide legs may assist in identifying when the driving angle of a driver device deviates from the desired angle.

Figure 4:
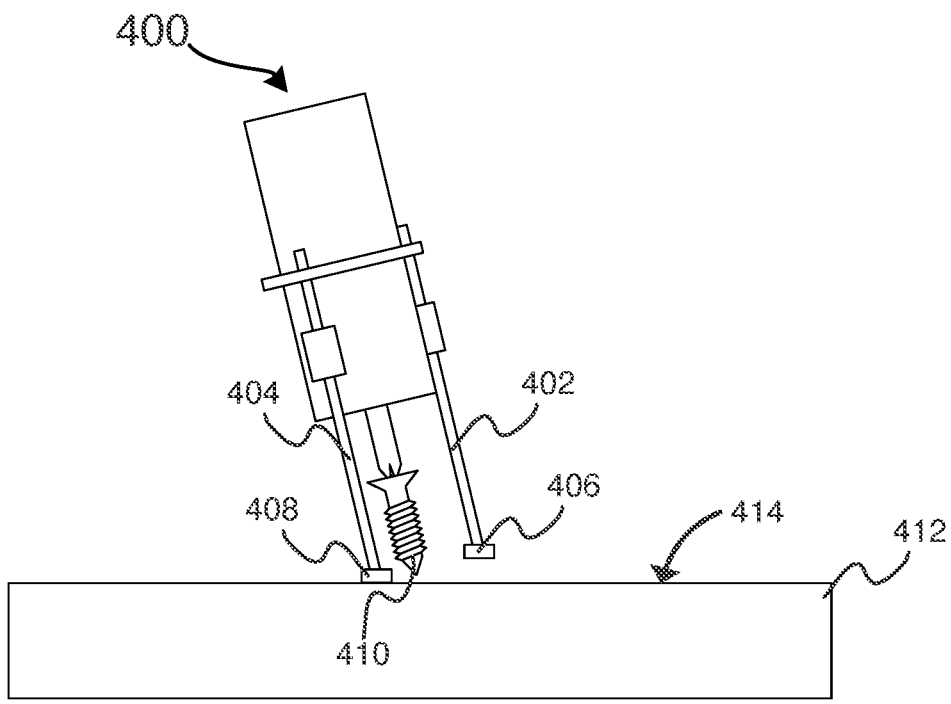
FIG. 4 depicts an example embodiment of a driver device with pressure sensors attached to a set of guide legs in a pressure fault condition.

FIG. 4 illustrates an example embodiment of a situation in which a driver device 400 may not be positioned at a desired angle even when the deployment levels of the guide legs 402 and 404 of driver device 400 would imply that the driver device 400 is ready to drive at the desired angle. Guide legs 402 and 404 contain feet 406 and 408 which take the form of pressure sensors. In FIG. 4, driver device 400 may be configured to drive screw 410 into driving recipient 412 at a 90 degree angle (i.e., perpendicular to surface 414). As illustrated, guide legs 402 and 404 are of equal length and are extended an equal amount (i.e., they have equal deployment levels), and thus based on guide legs 402 and 404 alone, one could conclude that the driver device 400 is configured to drive screw 410 at the desired angle.

However, consulting the measurements of pressure sensors 406 and 408 may disclose that pressure sensor 406 is not reading any pressure, and thus that guide leg 402 is not making contact with surface 414. Because guide leg 402 and guide leg 404 extend past the main housing of would imply that driver device 400 by the same amount, this would also imply that driver device 400 is not oriented at the desired angle of 90 degrees off of surface 414. This situation may be referred to as a fault condition, and driver device 400 may therefore trigger a fault response upon detecting it. For example, sensor 406 could contain a light that flashes red when a pressure-deviation value between pressure sensors 406 and 408 exceeds a threshold pressure-deviation value. In other embodiments, driver device 400 may contain a speaker, which may emit an audible noise at a user when the pressure-deviation value exceeds the threshold. In some embodiments, the fault response may prevent driver device 400 from driving screw 410 until the fault condition is remedied (e.g., until guide leg 402 is brought into contact with surface 414, and the pressure-deviation value drops below the pressure-deviation value threshold).

In some embodiments, remedying the fault condition may simply require bringing guide leg 402 into contact with surface 414. In these embodiments, the pressure-deviation-value threshold may be set high (e.g., 51%), such that even moderate pressure-deviation values (e.g., 50%) may be within the threshold and would not represent a fault condition. In other words, even pushing twice as hard on guide leg 402 as guide leg 404 may not represent a fault condition. Further, in some embodiments, sensors 406 and 408 may have a binary response. In other words, they may only be capable of detecting whether guide legs 402 and 404 are contacting surface 414 with a particular pressure, but may not be capable of measuring a numerical pressure. In these embodiments, as long as both guide legs 402 and 404 are being pressed into surface 414 with that minimum pressure (thus being recognized as contact by pressure sensors 406 and 408), no fault condition may be recognized.

In some embodiments, however, the remedying the fault condition may not only require bringing both guide legs 402 and 404 into contact with surface 414, but applying similar pressure to each guide leg. In other words, even if guide leg 402 is brought into contact with surface 414 and pressure sensor 406 detects that contact, the pressure-deviation value between pressure sensors 406 and 408 may still be too high, implying that driving screw 410 would still result in the driving angle deviating from the desired angle by too high a degree. In these embodiments, the pressure deviation value may be set low, requiring a similar pressure to be applied to each of guide leg 402 and 404.

The driving recipients illustrated in FIGS. 3A, 3B, and 4 depict completely flat, even surfaces. However, in some situations a driver device may be required to drive a driving object (e.g., a screw or drill bit) into a driving recipient with an uneven surface. In those instances, it may be beneficial for the deployment levels of the guide legs to be independently adjustable before driving the driving object.

Figure 5:
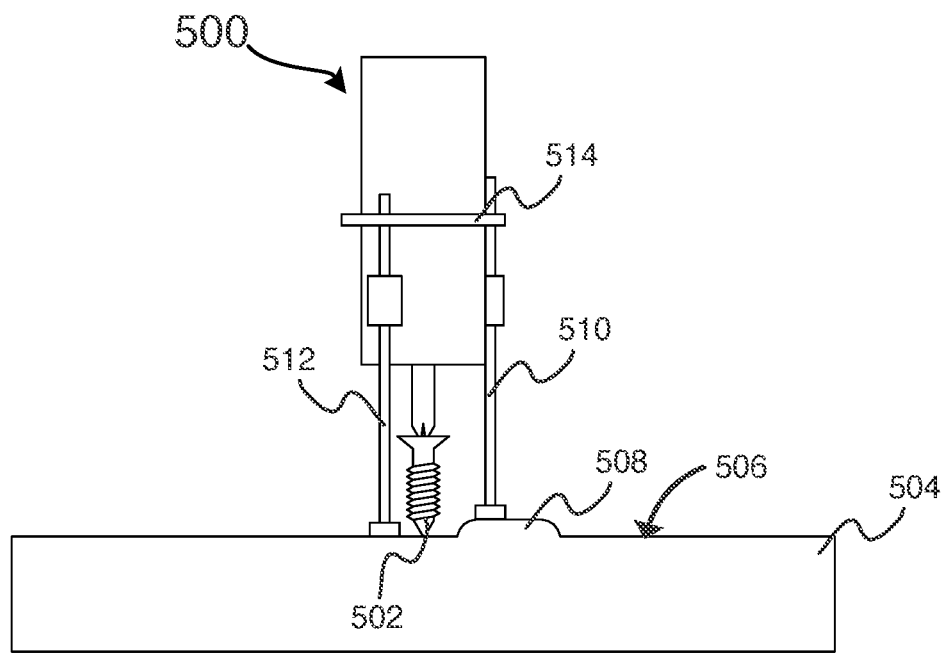
FIG. 5 depicts an example embodiment of a driver device with a set of guide legs that have been adjusted to an uneven surface of a driving recipient.

FIG. 5 illustrates a driver device 500 that has been adjusted to drive a screw 502 into a driving recipient 504 with an uneven surface 506. Specifically, surface 506 includes a bump 508 that is near the site at which screw 502 is to be inserted. Driver device also features guide legs 510 and 512 and proportional lock 514. As illustrated, guide leg 510 is extended slightly less than guide leg 512 (i.e., the deployment level of guide leg 510 is slightly smaller than the deployment level of guide leg 512) to account for the bump 508 on surface 506. In some embodiments, this could be accomplished by setting proportional lock 514 into an "unlocked" state, either with respect to guide leg 510 or all guide legs. Driver device 500 could then be pushed toward surface 508 until all guide legs contact surface 506. This may be detectable, for example, by sensors attached to the feet of the guide legs. At this point, the proportional lock could then be placed into a "locked" state, preventing the deployment levels of any guide leg (e.g., guide leg 510) from changing without causing an equal change on the deployment level of the other guide legs (e.g., guide leg 512). At this point, the driver device may be adjusted to drive screw 502 at a driving angle that is equal to (or sufficiently similar to) a desired angle.

As discussed with respect to FIGS. 3A, 3B, 4, and 5, driver devices will often be used to drive a driving object into a driving recipient at a desired angle of 90 degrees. However, this is not always the case. Similar to the driver device that was required to adjust a set of guide legs to an uneven surface in FIG. 5, some driver devices may be required to adjust a set of guide legs to desired angles other than 90 degrees. For example, some construction projects utilize pocket screws to attach wooden boards to other structural components in tight spaces or in a way that hides those screws in the finished project. Pocket screws require, however, to be inserted at a specific angle and typically require a pilot hole be drilled at that angle beforehand.

Figure 6:
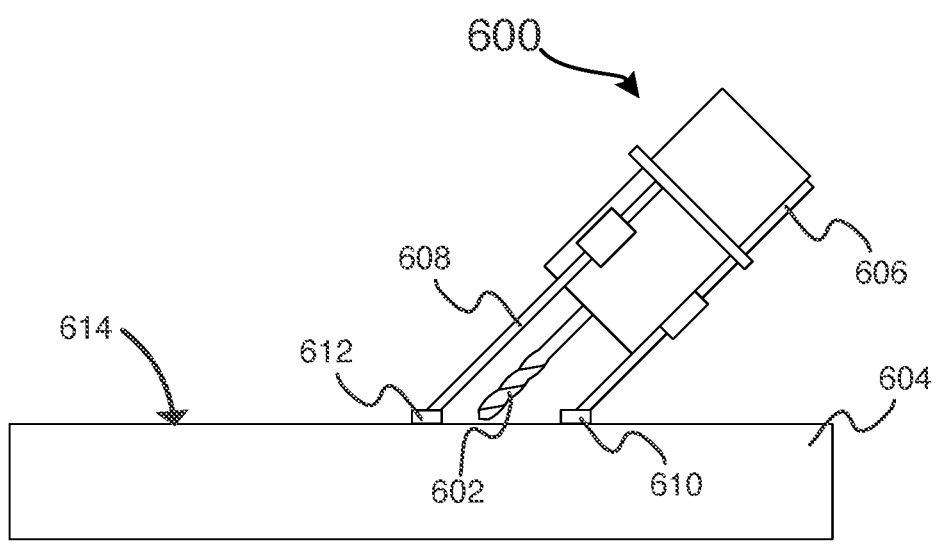
FIG. 6 depicts an example embodiment of a driver device with a set of guide legs that have been adjusted to drive a drill bit into a driving recipient at a non-perpendicular angle.

FIG. 6 illustrates a device driver 600 that has been adjusted to drive a drill bit 602 (the "driving object") into a driving recipient 604 at a desired angle of 45 degrees from the surface 614. Device driver 600 features guide legs 606 and 608. As illustrated, guide leg 608 is extended further than guide leg 606 (i.e., the deployment level of guide leg 608 is higher than the deployment level of guide leg 606). Guide legs 606 and 608 also have feet 610 and 612, which may take the form of rubber pads, pressure sensors, spikes (sometimes referred to as "cleats"), or a combination thereof. Because of the unequal deployment levels of guide legs 606 and 608, Driver device 600 is positioned at a 45 degree angle from surface 614 when feet 610 and 612 both contact surface 614. By driving drill bit 602 into driving recipient at this angle, a pilot hole of approximately 45 degrees from the surface 614 could be created. In other words, using the embodiment of FIG. 6, the accuracy of drilling a pilot hole at a certain desired angle may be improved. Similarly, the accuracy of driving other driving objects at a certain desired angle (e.g., driving screws or bolts) may also be improved.

In some embodiments of FIG. 6, the driving angle of driver device 600, and, by extension, the deployment levels of guide legs 610 and 612, may have been adjusted manually prior to the depiction of FIG. 6. For example, a user operator of driver device 600 may have released a proportional lock on driver device 600, allowing guide legs 606 and 608 to extend and retract independently of one another (and of any other guide legs not shown in FIG. 6, such as a third guide leg that may be situated behind guide leg 608). With both guide legs 606 and 608 extended past drill bit 602, the user operator may then have held driver device 600 at the desired angle (for example, by referencing one or more levels on the device housing or a display that digitally shows the angle of the device) and pushed the driver device towards driving recipient 604. Once both feet 610 and 612 contacted surface 614, the user operator may have confirmed the proper driving angle and reengaged the proportional lock.

In some embodiments of FIG. 6, the driving angle of driver device 600 may have been adjusted automatically prior to the depiction of FIG. 6. For example, a user operator may have entered the desired angle on a user interface on the device (e.g., using a dial, rubberized buttons, or a touchscreen display). Once the desired angle was entered, guide legs 606 and 608 may have automatically extended/retracted independently to the deployment levels illustrated in FIG. 6. In some embodiments, this may require the user to manually release a proportional lock, while in others the proportional lock may release and reengage automatically. As another example, a user may turn a dial connected to each guide leg to manually adjust the deployment level of that guide leg. Driver device 600 may calculate the resulting driving angle of the unequal deployment levels and display the calculated driving angle on a display (e.g., on a housing of driver device 600). The user operator may consult the display and continue adjusting the deployment levels of the guide legs until the displayed driving angle is sufficiently close to the desired angle.

In some instances, being able to adjust a driving angle to match a desired angle before operation, as discussed with respect to FIG. 6, may be beneficial. For example, a driver device may be used to drill many holes (or insert many screws) at a particular angle (e.g., 60 degrees from a surface). In these instances, it may significantly decrease the time necessary to drill all the holes if the driving angle can be set in advance, and remains proportionally locked during the entire project. This may result in the holes being drilled with a greater precision than previously possible.

Figure 7:
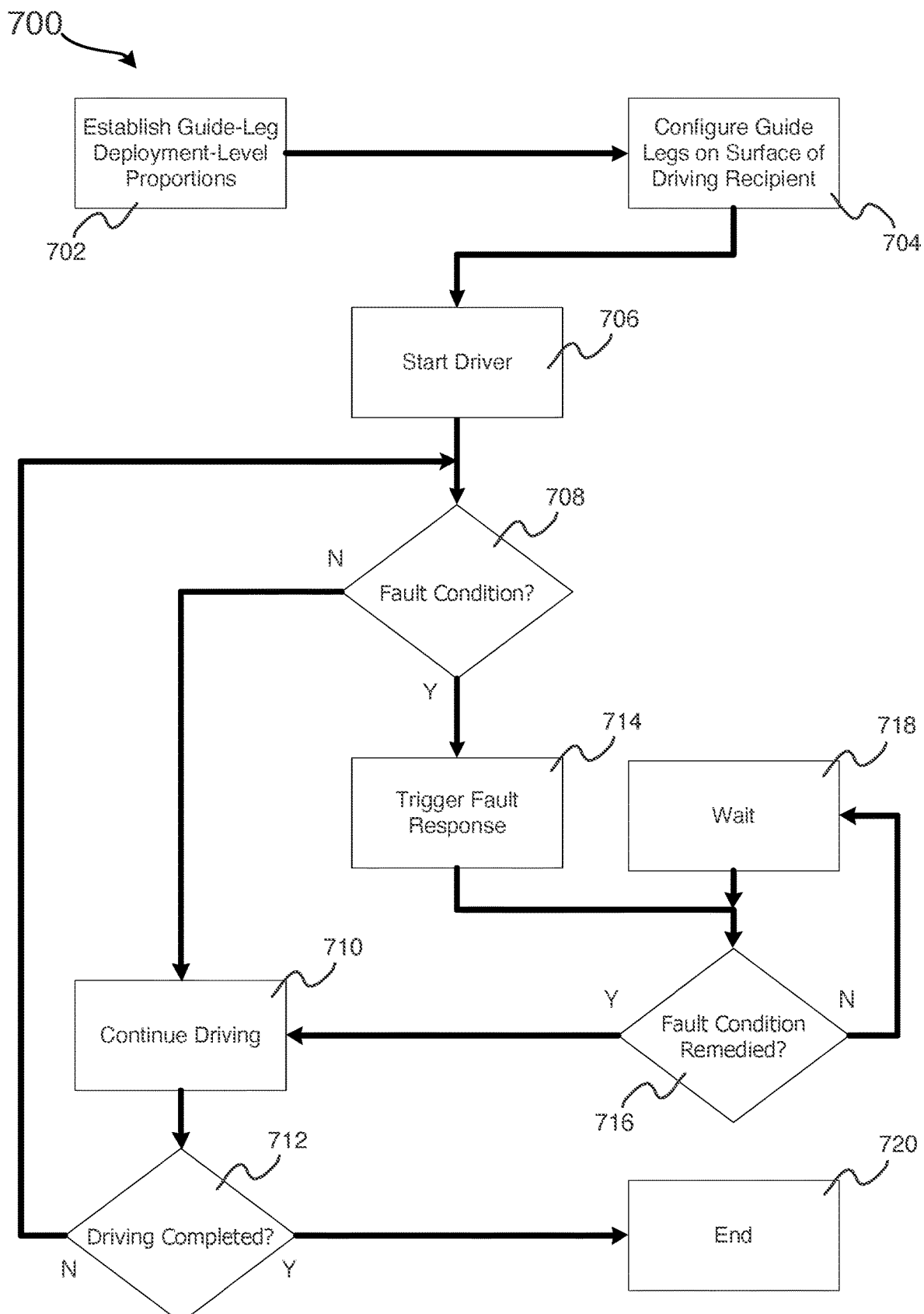
FIG. 7 depicts an example method of responding to a fault condition when operating a driver device in accordance with embodiments of the present disclosure.

FIG. 7 illustrates an example method 700 of utilizing a driver device in accordance with the embodiments of the present disclosure. Method 700 may, in some embodiments, be performed automatically by a system operating a driver device, such as system 800 of FIG. 8. In some embodiments, a system performing method 700 may work in conjunction with a user, who may operate some aspects of the driver device (e.g., deciding upon a desired angle).

In block 702, the proportions of the deployment levels of the guide legs of a driver device are established. For example, a desired angle may be 90 degrees from the surface of a driving recipient, and the driving recipient's surface may be completely flat. In this example, it may be beneficial to establish all guide legs with equal deployment levels. In some embodiments, establishing the guide-leg proportions may involve somehow programming the desired angle into the driver device, such as with a dial, buttons, or touchscreen display (as discussed with respect to FIG. 6). In these embodiments, a processor on the driver device may automatically extend and retract the guide legs to match the selected desired angle. In some embodiments, a user may manually configure the guide legs, such as by adjusting a dial or slider attached to each guide leg. In some embodiments, a user or robotic arm may position the driver device into the desired angle and then push the driver device towards the surface of the driving recipient until all guide legs touch the surface.

In some embodiments, establishing the guide-leg deployment level proportions may involve switching a proportional lock into an unlocked state, and configuring the guide legs, then switching the proportional lock back into a locked state. Finally, in some embodiments of the present disclosure (not pictured in FIG. 7), establishing the deployment-level proportions may be unnecessary, because a proportional lock may be permanently in a locked state, keeping the guide-leg deployment-level proportions constant. For example, an impact driver may have a proportional lock that always keeps three deployment legs at an equal deployment level so the deployment legs can be used to reliably operate at a 90 degree driving angle.

In block 704 the guide legs are configured onto the surface of the driving recipient. In some embodiments, this may involve a robotic arm moving the driver device towards the driving recipient until a pressure sensor on each guide leg registers contact between the guide leg and the surface. In other embodiments, a user may be directed to position the driver device on the surface of the driving recipient. In some embodiments, block 704 may actually be an extension of block 702 (for example, where the guide-leg deployment levels were established by pushing the driver device onto the driving recipient).

Once the guide legs are securely on the surface of the driving recipient, the driver is started in block 706. This may involve starting a motor in the driver device to cause a driving object to spin rapidly and pushing the driver device towards the driving recipient. In some embodiments, these actions may be performed automatically (for example, by a robotic arm or drill press), or manually by a user that is directed to operate the driver device. In block 708, the system determines if a fault condition has been detected. A fault condition may be detected, for example, if the driver device guide legs contain pressure sensors that are not measuring equal pressure. This may occur if the driver device is not being pressed in a straight line (i.e., along the desired angle), which may cause the driving angle and the desired angle to differ. In some embodiments, such a fault condition may be detected by calculating the difference between the pressure readings (i.e., calculating the pressure-deviation value) and comparing that difference to a threshold pressure-deviation value. If the difference is above the threshold, a fault condition would be detected.

A fault condition may also be detected, for example, if the driver device guide legs are retracting at different rates, causing a deviation in their deployment levels. This may also occur if the driver device is not being pressed in a straight line, and may also cause the driving angle and the desired angle to differ. In some embodiments, such a fault condition may be detected by monitoring the changes of the deployment levels of the guide legs, or measuring the current deployment levels of the guide legs, and comparing the extent to which the deployment levels deviate to a target deviation value. If, for example, the deployment level of one guide leg has changed by 25% and the deployment level of second guide leg has changed by 15%, a 10% deviation may be identified. That 10% deviation value may be compared to the a target deviation value of 2%, at which point the system may detect that the amount that the guide leg's deployment values have deviated is too large.

In some embodiments, this type of fault condition may also identify an acceptable deviation value and compare the actual deviation value to that acceptable deviation value. For example, the acceptable deviation value may take the form of a threshold, such as 2 mm. The system may calculate the actual deviation value by measuring the deployment level of a first guide leg (e.g., 400 mm) and compare it to the deployment level of a second guide leg (e.g., 399 mm). If the difference between those two deployment levels is above the acceptable deviation value, a fault condition would be detected.

If a fault condition is not detected in block 708, the system continues driving the driver device in block 710, and determines whether the driving has been completed in block 712. The driving may be completed if the driving object has been sufficiently driven into the driving recipient (for example, if a screw is flush with the surface of the driving recipient or if a drill bit has created a pilot hole that is of a predetermined length). If the driving has not been completed, the system returns to block 708 to continue to monitor for a fault condition as the driving process continues.

If, on the other hand, a fault condition is detected in block 708, a fault response is triggered in block 714. In some embodiments, a fault response may include notifying a user of the fault response. For example, the driver device may have a warning light that lights up when a fault condition is detected, or may have a speaker to emit a sound when a fault condition is detected. In some embodiments, a fault response may include interrupting the driver device to stop the driving process. For example, the system may stop a flow of current to a motor within the driver device that is causing the driving object to spin. In some embodiments, the system may detach a gear that connects a motor to a driving bit, preventing the driving bit from spinning. In some embodiments, the fault response may also include remedying the fault condition (e.g., causing a robotic arm to reposition the driver device, providing instructions to a user to change the angle of the driver device).

In block 716, the system determines whether the fault condition is remedied. If it is not remedied, the system continues to wait for the fault condition to be remedied in block 718, after which the system returns to block 716. If the system does determine that the fault condition has been remedied, the system continues the driving process in block 710 and determines whether the driving process has been completed in block 712. As discussed previously, if the system determines that the driving process has not been completed, the system returns to block 708 to continue to monitor for a fault condition as the driving process continues. However, if the driving process has been completed, method 700 ends in block 720, which may include disengaging/shutting off the driver device.

Figure 8:
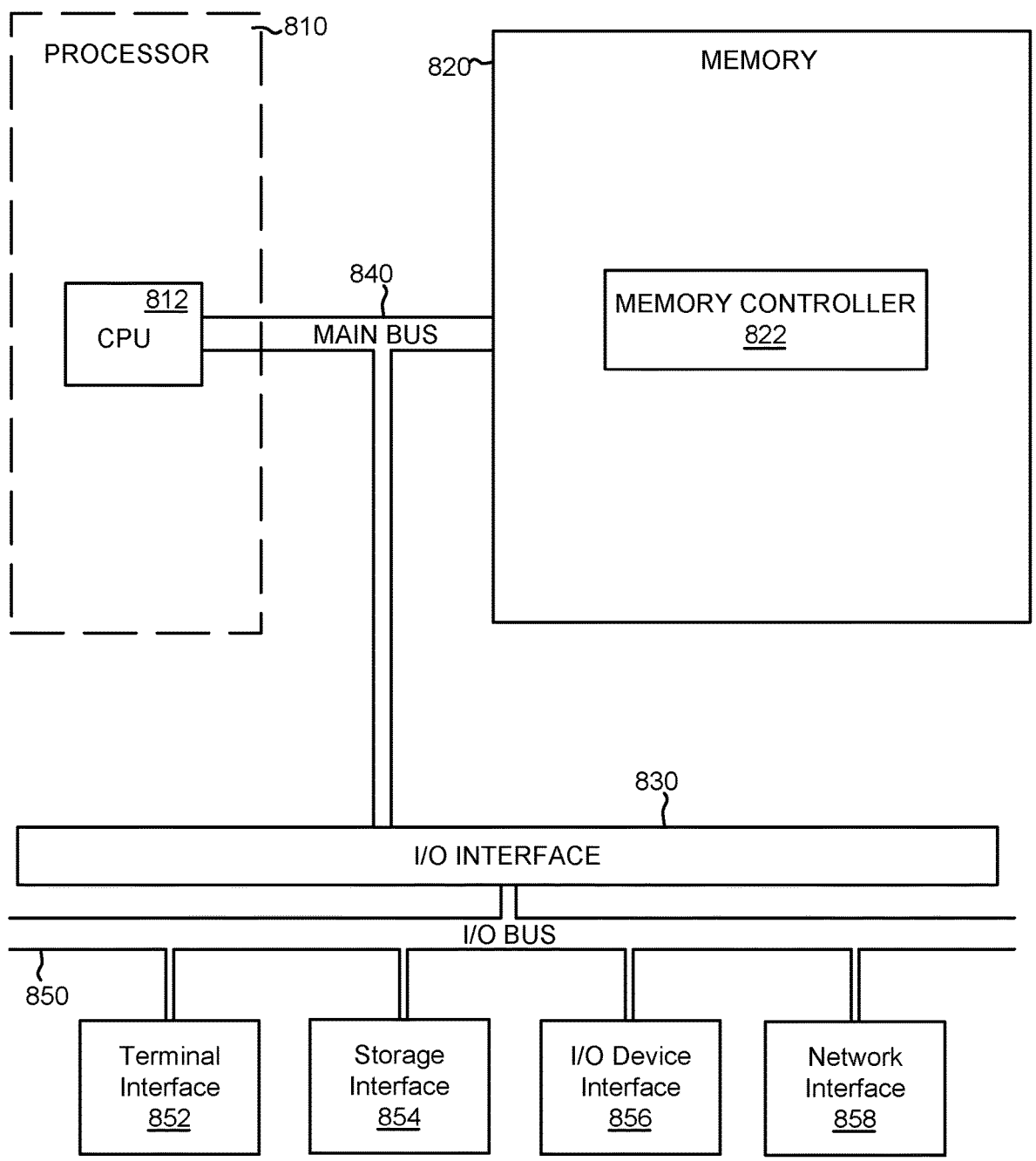
FIG. 8 depicts the representative major components of a computer system that may be used in accordance with embodiments of the present disclosure.

FIG. 8 depicts the representative major components of an example Computer System 801 that may be used in accordance with embodiments of the present disclosure. The particular components depicted are presented for the purpose of example only and are not necessarily the only such variations. The Computer System 801 may include a Processor 810, Memory 820, an Input/Output Interface (also referred to herein as I/O or I/O Interface) 830, and a Main Bus 840. The Main Bus 840 may provide communication pathways for the other components of the Computer System 801. In some embodiments, the Main Bus 840 may connect to other components such as a specialized digital signal processor (not depicted).

The Processor 810 of the Computer System 801 may include one or more CPUs 812. The Processor 810 may additionally include one or more memory buffers or caches (not depicted) that provide temporary storage of instructions and data for the CPU 812. The CPU 812 may perform instructions on input provided from the caches or from the Memory 820 and output the result to caches or the Memory 820. The CPU 812 may include one or more circuits configured to perform one or methods consistent with embodiments of the present disclosure. In some embodiments, the Computer System 801 may contain multiple Processors 810 typical of a relatively large system. In other embodiments, however, the Computer System 801 may be a single processor with a singular CPU 812.

The Memory 820 of the Computer System 801 may include a Memory Controller 822 and one or more memory modules for temporarily or permanently storing data (not depicted). In some embodiments, the Memory 820 may include a random-access semiconductor memory, storage device, or storage medium (either volatile or non-volatile) for storing data and programs. The Memory Controller 822 may communicate with the Processor 810, facilitating storage and retrieval of information in the memory modules. The Memory Controller 822 may communicate with the I/O Interface 830, facilitating storage and retrieval of input or output in the memory modules. In some embodiments, the memory modules may be dual in-line memory modules.

The I/O Interface 830 may include an I/O Bus 850, a Terminal Interface 852, a Storage Interface 854, an I/O Device Interface 856, and a Network Interface 858. The I/O Interface 830 may connect the Main Bus 840 to the I/O Bus 850. The I/O Interface 830 may direct instructions and data from the Processor 810 and Memory 820 to the various interfaces of the I/O Bus 850. The I/O Interface 830 may also direct instructions and data from the various interfaces of the I/O Bus 850 to the Processor 810 and Memory 820. The various interfaces may include the Terminal Interface 852, the Storage Interface 854, the I/O Device Interface 856, and the Network Interface 858. In some embodiments, the various interfaces may include a subset of the aforementioned interfaces (e.g., an embedded computer system in an industrial application may not include the Terminal Interface 852 and the Storage Interface 854).

Logic modules throughout the Computer System 801—including but not limited to the Memory 820, the Processor 810, and the I/O Interface 830—may communicate failures and changes to one or more components to a hypervisor or operating system (not depicted). The hypervisor or the operating system may allocate the various resources available in the Computer System 801 and track the location of data in Memory 820 and of processes assigned to various CPUs 812. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A driver device comprising:
a housing;
a driving-bit socket in the housing;
a first guide-leg track on the housing;
a first guide leg inserted into the first guide-leg track, wherein a first deployment level describes the extent to which the first guide leg is retracted into the first guide-leg track;
a second guide-leg track on the housing; and
a second guide leg inserted into the second guide-leg track;
wherein the first guide leg retracts into the first guide-leg track as the driver device drives a driving object into the driving recipient.

2. The driver device of claim 1, further comprising:
a first guide-leg foot at an end of the first guide leg, wherein the first guide-leg foot is configured to interface with a surface of the driving recipient;
a third guide-leg track on the housing;
a third guide leg inserted into the third guide-leg track, wherein a second deployment level describes the extent to which the second guide leg is retracted into the second guide-leg track and wherein a third deployment level describes the extent to which the third guide leg is retracted into the third guide-leg track;
a second guide-leg foot at an end of the second guide leg, wherein the second guide-leg foot is configured to interface with the surface of the driving recipient; and
a third guide-leg foot at an end of the third guide leg wherein the third guide-leg foot is configured to interface with the surface of the driving recipient.

3. The driver device of claim 2, further comprising:
a proportional lock coupled with the first guide leg, the second guide leg, and the third guide leg, wherein the proportional lock has a locked state and an unlocked state, and wherein the locked state of the proportional lock causes the second and third deployment levels to decrease by a first amount when the first deployment level decreases by the first amount.

4. The driver device of claim 2, wherein the first guide-leg foot comprises a first pressure sensor, the second guide-leg foot comprises a second pressure sensor, and the third guide-leg foot comprises a third pressure sensor.

5. The driver device of claim 4, wherein the driver device is configured to trigger a fault response during operation of the driver device if a measurement the first pressure sensor deviates from a measurement of the second pressure sensor by more than a threshold pressure deviation value.

6. The driver device of claim 5, wherein the fault response comprises preventing the driver device from driving the driving object.

7. The driver device of claim 2, wherein the driver device is configured to trigger a fault response during operation of the driver device if the first deployment level changes with respect to the second deployment level by more than a threshold deployment deviation value.

8. The driver device of claim 1, further comprising a first guide-leg foot at an end of the first guide leg, wherein the first guide-leg foot is configured to interface with a surface of the driving recipient and wherein the first guide-leg foot comprises a seating ring.

* * * * *